United States Patent
Kang et al.

(10) Patent No.: US 10,460,125 B2
(45) Date of Patent: Oct. 29, 2019

(54) APPARATUS AND METHOD FOR AUTOMATIC QUERY PROCESSING

(71) Applicant: Samsung Electronics Co., Ltd., Suwon-si (KR)

(72) Inventors: Byung Kon Kang, Gwangju-si (KR); Kyoung Gu Woo, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 376 days.

(21) Appl. No.: 15/240,172

(22) Filed: Aug. 18, 2016

(65) Prior Publication Data

US 2017/0060938 A1 Mar. 2, 2017

(30) Foreign Application Priority Data

Aug. 27, 2015 (KR) .................. 10-2015-0121251

(51) Int. Cl.
| | |
|---|---|
| *G06F 17/30* | (2006.01) |
| *G06F 21/62* | (2013.01) |
| *G06Q 10/00* | (2012.01) |
| *G06F 16/9032* | (2019.01) |
| *G06F 16/903* | (2019.01) |

(52) U.S. Cl.
CPC .... *G06F 21/6227* (2013.01); *G06F 16/90332* (2019.01); *G06F 16/90335* (2019.01); *G06Q 10/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,873,076 A | * | 2/1999 | Barr | ................ G06F 17/30864 704/270.1 |
| 6,701,294 B1 | | 3/2004 | Ball et al. | |
| 8,554,540 B2 | | 10/2013 | Lee et al. | |
| 9,582,539 B1 | * | 2/2017 | Cole | ................ G06F 17/30339 |
| 2013/0226906 A1 | | 8/2013 | Lebrun et al. | |
| 2014/0114659 A1 | | 4/2014 | Sharifi et al. | |
| 2014/0172828 A1 | | 6/2014 | Mo et al. | |
| 2014/0201203 A1 | | 7/2014 | Krishna et al. | |
| 2014/0278351 A1 | | 9/2014 | Clark et al. | |

FOREIGN PATENT DOCUMENTS

| | | |
|---|---|---|
| KR | 2002-0027707 A | 4/2002 |
| KR | 10-2013-0021944 A | 3/2013 |
| KR | 10-1322486 B1 | 10/2013 |

OTHER PUBLICATIONS

Mariana Raykova. Usable, Secure, Private Search. Sep./Oct. 2012. IEEE. pp. 53-690 (Year: 2012).*

* cited by examiner

*Primary Examiner* — Tuankhanh D Phan
(74) *Attorney, Agent, or Firm* — Cha & Reiter, LLC

(57) ABSTRACT

Apparatuses and methods for automatic query processing are disclosed, which includes a query analyzer configured to a query analyzer configured to extract the query condition from the input query, a scheduler configured to create one or more sub-queries to verify whether the query condition is satisfied, and to determine an execution condition for the one or more sub-queries, and a condition verifier configured to execute the one or more sub-queries according to the determined execution condition, and to verify whether the query condition is satisfied using results of executing the one or more sub-queries.

16 Claims, 6 Drawing Sheets

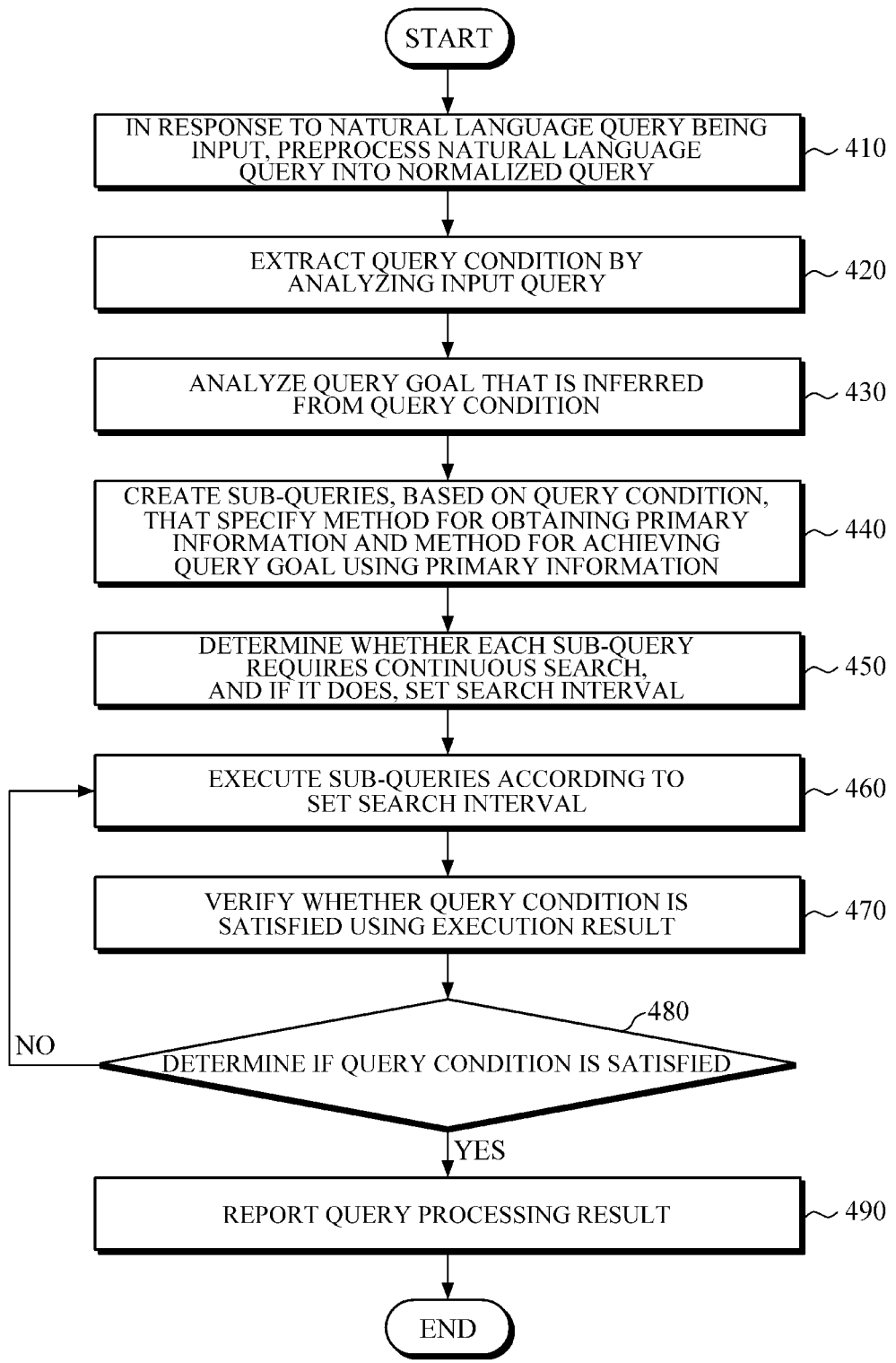

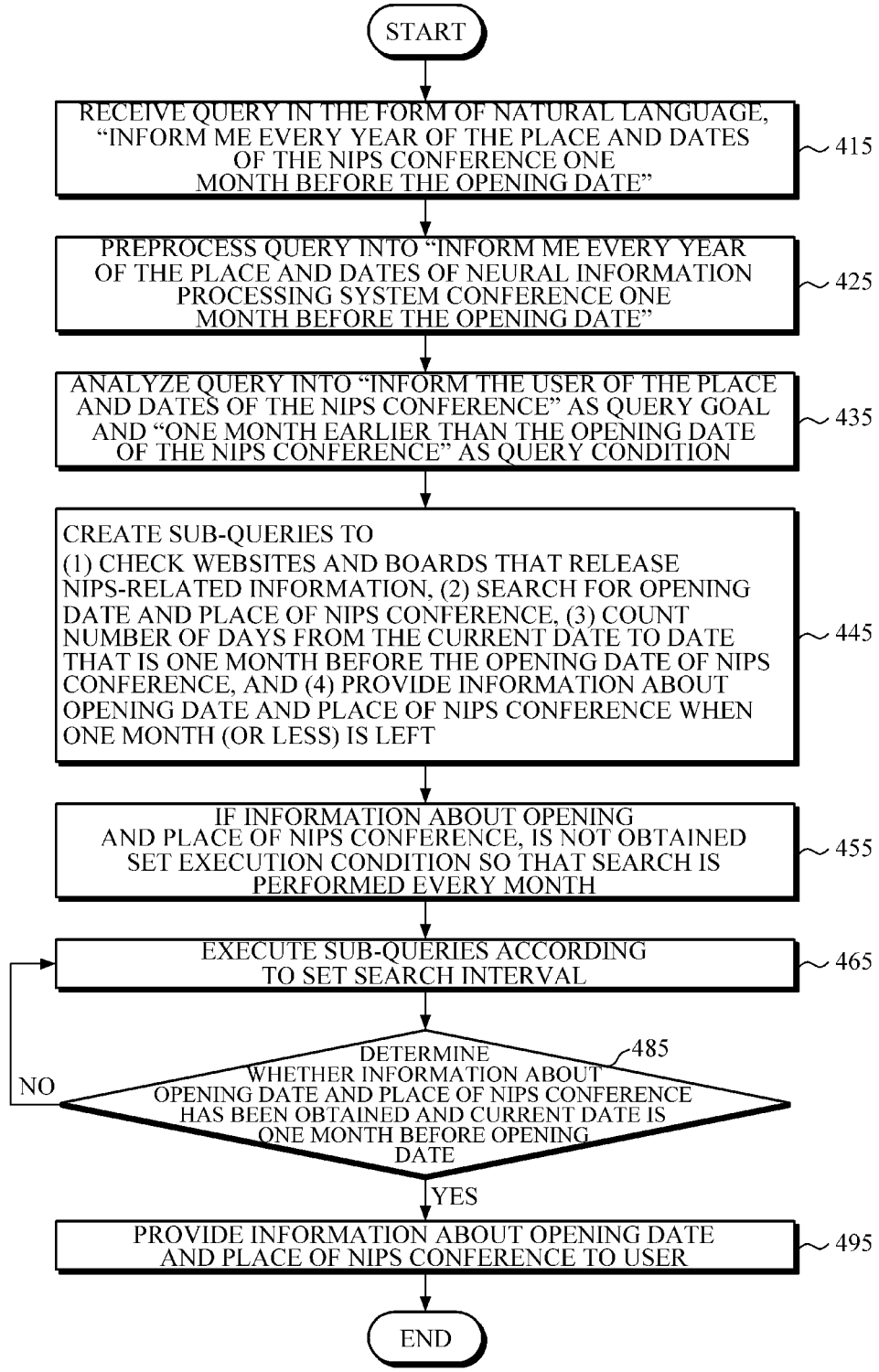

APPARATUS AND METHOD FOR AUTOMATIC QUERY PROCESSING

CROSS-REFERENCE TO RELATED APPLICATION(S)

This application claims the benefit under 35 USC § 119(a) of Korean Patent Application No. 10-2015-0121251, filed on Aug. 27, 2015, in the Korean Intellectual Property Office, the entire disclosure of which is incorporated herein by reference for all purposes.

BACKGROUND

1. Field

The following description relates to a software agent for search.

2. Description of Related Art

In order to obtain up-to-date information, a user may need to manually search for needed information or may automate the search process using software.

Rich Site Summary (RSS) feed alerts a user to any update or change that occurs in content of websites, which the user has subscribed. The RSS feed, however, only passively determines the update of the website and does not actively search for related information, and hence it is difficult to extract personalized information using RSS feed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for automatic query processing including a processor configured to extract a query condition from an input query, create one or more first sub-queries to verify whether the query condition is satisfied, and to determine an execution condition for the one or more first sub-queries, and execute the one or more sub-queries according to the determined execution condition, and to verify whether the query condition is satisfied using results of executing the one or more first sub-queries.

The processor may include a query analyzer configured to extract the query condition from the input query, a scheduler configured to create one or more first sub-queries to verify whether the query condition is satisfied, and to determine an execution condition for the one or more first sub-queries, and a condition verifier configured to execute the one or more first sub-queries according to the determined execution condition, and to verify whether the query condition is satisfied using results of executing the one or more first sub-queries.

The preprocessor may be configured to transform a natural language query into a normalized query, in response to the input query being the natural language query.

The query analyzer may be configured to analyze the input query to extract a query goal, and the scheduler is further configured to create one or more second sub-queries to achieve the extracted query goal.

The execution condition for the one or more first sub-queries and the one or more first sub-queries may include any one or any combination of a search target, a search method, a search range, a search time, and a search interval.

The scheduler may be configured to determine whether each of the first sub-queries and the second sub-queries requires continuous search, and to determine the search interval for a sub-query, in response to the sub-query requiring continuous search.

The scheduler may be configured to determine whether each of the first sub-queries and the second sub-queries requires continuous search based on any one or any combination of characteristics of primary information, update rules for primary information, similar situations, and search results.

The condition verifier may be configured to search any one or any combination of the web, a cloud, and a database, and to obtain results of executing the first sub-queries by analyzing found content.

The condition verifier may be configured to analyze the found content by referencing any one or any combination of user information, environmental information, and device information.

The apparatus may include an authentication setter configured to request a user for authentication information or to store authentication information in advance, in response to the authentication information being needed for the one or more first sub-queries.

The apparatus may include a reporter configured to report a result of processing the input query in the form of summary, extraction, or the combination of the two.

The apparatus may include a query validity checker configured to check a valid time period of the input query and whether to repeat execution of the input query.

The scheduler may be configured to identify a keyword from the input query as a search target and to execute the one or more first sub-queries or the one or more second sub-queries according to the determined execution condition and the keyword.

In another general aspect, there is provided a method for automatic query processing, including extracting a query condition by analyzing an input query, creating one or more first sub-queries to verify whether the query condition is satisfied, and to determine an execution condition for the one or more first sub-queries, executing the one or more first sub-queries according to the determined execution condition, and verifying whether the query condition is satisfied, using results of executing the one or more first sub-queries.

The method may include transforming a natural language query into a normalized query, in response to the input query being the natural language query.

The extracting of the query condition may include analyzing the input query to extract a query goal, and the creating of the one or more first sub-queries comprises creating one or more second sub-queries for achieving the extracted query goal.

The execution condition for the one or more first sub-queries or the one or more second sub-queries may include any one or any combination of a search target, a search method, a search range, a search time, and a search interval.

The determining of the execution condition may include determining whether each of the one or more first sub-queries and the second sub-queries requires continuous search, and determining the search interval for a sub-query, in response to the sub-query requiring continuous search.

The determining of the execution condition may include determining whether each of the first sub-queries and the second sub-queries requires continuous search based on any one or any combination of characteristics of primary information, update rules for primary information, similar situations, and search results The executing of the sub-queries may include searching any one or any combination of the web, a cloud, and a database, and obtaining results of executing the first sub-queries by analyzing found content.

The method may include requesting a user for authentication or storing authentication information in advance, in response to the authentication information being needed for the one or more first sub-queries.

The method may include reporting a result of processing the input query in the form of summary, extraction, or the combination of the two.

In another general aspect, there is provided a method for automatic query processing, including extracting a query condition and a query goal from an input query, creating one or more sub-queries to verify whether the query condition and query goal are satisfied, determining an execution sequence and execution condition for the one or more sub-queries, executing the one or more sub-queries based on the execution sequence and the execution condition, and verifying the query condition is satisfied based on the result of the executing of the one or more sub-queries.

The method may include setting a search interval for a sub-query of the one or more sub-queries, in response to a determination that the sub-query requires periodic searches.

The method may include discarding the input query, in response to a determination that it is impossible to satisfy the input query condition.

The method may include discarding the input query, in response to a determination that a valid time for the input query has elapsed.

Other features and aspects will be apparent from the following detailed description, the drawings, and the claims.

BRIEF DESCRIPTION OF THE DRAWINGS

FIG. 4A is a diagram illustrating an example of a method for automatic query processing according to the apparatus shown in FIG. 2.

FIG. 4B is a diagram illustrating an example of the method for automatic query processing according to the apparatus shown in FIG. 2.

Figure 1:
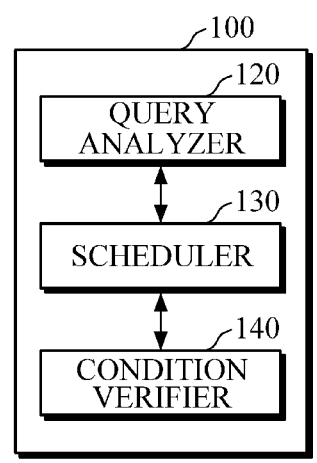
FIG. 1 is a diagram illustrating an example of the apparatus for automatic query processing.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In an example, the apparatus for automatic query processing 100 may embedded in or interoperate with various digital devices such as, for example, an intelligent agent, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein. The digital devices may be implemented in a smart appliance, an intelligent vehicle, a smart home environment, a smart building environment, a smart office environment, office automation, and a smart electronic secretary system.

The digital devices may also be implemented as a wearable device, which is worn on a body of a user. In one example, a wearable device may be self-mountable on the body of the user, such as, for example, a watch, a bracelet, or as an eye glass display (EGD), which includes one-eyed glass or two-eyed glasses. In another non-exhaustive example, the wearable device may be mounted on the body of the user through an attaching device, such as, for example, attaching a smart phone or a tablet to the arm of a user using an armband, incorporating the wearable device in a cloth of the user, or hanging the wearable device around the neck of a user using a lanyard.

FIG. 1 is a diagram illustrating an example of the apparatus for automatic query processing Referring to FIG. 1, the apparatus 100 includes a query analyzer 120, a scheduler 130, and a condition verifier 140.

In an example, the query analyzer 120 extracts a query condition by analyzing an input query. In an example, the query analyzer 120 analyzes the meaning of the query to figure out a user's request, dissects the query into a query goal and a query condition, and extracts the query condition. In an example, the query condition may be specified in the query input by the user. In another example, the query analyzer 120 may be able to infer the query condition based on the user's request and query goal that were determined from the input query. The query analyzer 120 divides the query into two parts: the query goal and the query condition; when the query condition is satisfied, the query goal can be achieved through specific query processing. In a non-exhaustive example, the query may be in the form of natural language, or in the form of a machine-understandable logical expression. Other form of query, such as, for example gestures, touch, multi-touch, eye motion, and surface acoustic wave (SAW) may be used without departing from the spirit and scope of the illustrative examples described.

In an example, the scheduler 130 creates one or more sub-queries to check whether the query condition is satisfied, and sets an execution condition for the sub-queries. The query may be of a simple form that contains only one or two requests to be handled, but it may contain a complex condition or requires continuous acquisition of information. The scheduler 130 may segment a query in complex form into sub-queries, and determine the execution sequence and the execution condition for the sub-queries. The scheduler 130 may classify some information as primary information, designate a route for obtaining the primary information, and create the sub-queries so that an operation can be executed using reference information and the primary information.

In one example, the scheduler 130 may create one or more sub-queries that are related to a method for achieving the extracted query goal. For example, the scheduler 130 may identify a keyword that is a user's interest extracted from the query as a search target, and may then create sub-queries regarding the website, search method, and the time at which a search is to be carried out. The sub-queries may be created in the form of a specific query execution method according to the query goal.

For example, if the query is "if Jane Smith's new book is published, please let me know the title and a price", the query goal is "acquisition of the title and price of Jane Smith's new book" and the query condition is "if Jane's Smith's new book is published". In this case, the scheduler 130 may create sub-queries to (1) search online bookstores for books written by Jane Smith; (2) check whether there is a book released since the query; and (3) if there is a book released since the query, extract the book title and the price from book information of the found book written by Jane Smith.

In addition, the scheduler 130 may determine a search target, a search method, a search range, a search time, and a search interval, as the execution condition for the sub-queries. According to one example, the scheduler 130 may determine whether the sub-queries require continuous search based on one or more of characteristics of primary information, update rules for primary information, similar situations, and search results. For example, if any one item of primary information needed for achieving the sub-query's goal is not obtained, the scheduler 130 may decide to repeat the search and designate the search interval as the execution condition.

If the query condition requires the continuous search, such as, for example, if user needs to be informed of any unread messages in a mailbox, continuous search is carried out so that when information is updated, any acquired information can be conveyed to the user. In an example, the scheduler 130 may designate a search range and a search interval as execution conditions so that mailbox search is carried out once a week, every day, or every few hours.

In an example, for the query to monitor a new book of Jane Smith, the scheduler 130 may set the search interval to be "several months" based on a general time interval at which a new book is published. In another example, the scheduler 130 may determine whether to increase or reduce the search interval in view of the Jane Smith's record of publishing books.

In another example, if the goal of the query is acquisition of weather information, the scheduler 130 may determine the search interval to be a day or several hours based on characteristics of weather information, which is the primary information. In another example, if the query is "please let me know the score update in the soccer game," the scheduler 130 may set the execution condition for a sub-query as "every minute" or "when game information is updated."

The condition verifier 140 may execute the sub-query according to the designated execution condition, and verify whether the query condition has been satisfied. According to one example, the condition verifier 140 may search the web, a cloud, a data store, and a database; find content; analyze the content; and obtain a result of executing the sub-query.

In one example, the condition verifier 140 may search for web content regarding primary information needed for executing the sub-query, and extract the needed primary information from found web content. In another example, the condition verifier 140 may alter a method for searching for the needed primary information by performing a related search.

In addition to the above examples, the condition verifier 140 may execute the sub-queries using various search means and search ranges, and hence the range of search by the condition verifier 140 will not be construed to be limited to the aforesaid embodiments. Other search means and search ranges may be used without departing from the spirit and scope of the illustrative examples described.

The condition verifier 140 may analyze the found content by referencing one or more of user information, environmental information, and device information. The apparatus 100 may obtain needed user information, environmental information, device information or the like from sources, such as, for example, the digital devices or the cloud server in which the apparatus 100 is mounted. For example, in the case where the apparatus 100 is embedded in a smartphone, the condition verifier 140 may obtain a result of executing the sub-query by referencing user information, such as user's schedules, text messages, documents that are stored in the smartphone. If needed information is stored in another device, the condition verifier 140 may be able to search the another device, if search authentication has been obtained.

In an example, the condition verifier 140 verifies whether the query condition is satisfied based on the result of executing the sub-query. If the satisfaction of the query condition is not possible or fails, the query may be discarded.

According to an example, the query input by the user may be related to other devices that are connected to the apparatus 100 over a network. For example, if the query "if the black toner of the printer is less than 10% or less than five sheets of paper are left, text me" is input to the query analyzer 120, the condition verifier 140 may monitor the operation status of the printer and verify whether a query condition is satisfied or not.

In addition to the above examples, the apparatus 100 may maintain office automation and a home network in the optimum condition in a home network environment.

Figure 2:
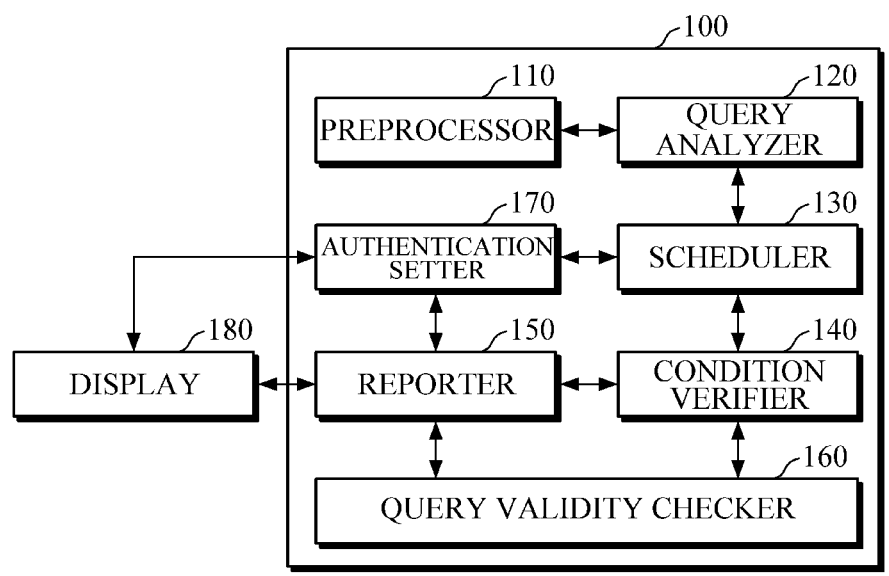
FIG. 2 is a diagram illustrating an example of the apparatus for automatic query processing.

FIG. 2 is a diagram illustrating another example of the apparatus for automatic query processing. Referring to FIG.

2, the apparatus 100 includes a preprocessor 110, a query analyzer 120, a scheduler 130, a condition verifier 140, a reporter 150, a query validity checker 160, an authentication setter 170, and a display 180. In addition to the description of FIG. 2 below, the above descriptions of FIG. 1 are also applicable to FIG. 2, and are incorporated herein by reference. Thus, the above description may not be repeated here.

In response to a natural language query being input, the preprocessor 110 may transform the input query into a normalized query. In an example, a query in the form of natural language that people use is transformed into a machine-understandable form.

In an example, the preprocessor 110 preprocesses the natural language query by defining abbreviation or acronym that are contained in the natural language query and correcting typos, errors and a format of a query sentence. For example, if the natural language query, "Inform me every year of the place and dates of the NIPS conference before one month earlier that the opening date", is input, the preprocessor 110 recognizes that "NIPS" is the acronym of "Neural Information Processing System" and preprocesses the input query to "inform me every year of the place and dates of Neural Information Processing System conference one month before the opening date".

The query analyzer 120 may analyze the meaning of the preprocessed query to extract a query condition from the query. In an example, the query analyzer 120 identifies the user's request and analyzes the query into a query goal and a query condition. In an example, the query analyzer 120 analyzes the query into "inform the user of the place and dates of the NIPS conference" as a query goal and "one month earlier than the opening date of the NIPS conference" as a query condition.

In an example, the scheduler 130 creates sub-queries to verify whether the query condition is satisfied, and sets an execution condition for the created sub-queries. For example, the scheduler 130 may create sub-queries to (1) check websites and boards that release NIPS-related information, (2) search for an opening date and place of the NIPS conference, (3) count the number of days from the current date to a date one month before the opening date of the NIPS conference, and (4) provide information about the opening date and place of the NIPS conference a month (or less) beforehand.

In an example, if the scheduler 130 fails to obtain information about the opening date and place of the NIPS conference, the scheduler 130 may set the execution condition for searching for the information every month. In an example, the scheduler 130 determines a search interval by combining the interval at which NIPS conference is held and the rules for update of NIPS-related notification. However, the above description will be construed as the example, and the scheduler 130 may determine various execution conditions in addition to the search interval.

In an example, the condition verifier 140 executes the sub-queries according to the set execution condition, and verifies whether the query condition is satisfied, by using the results of executing the sub-queries. The condition verifier 140 may execute the sub-queries, obtain primary information, and perform operations to achieve the query goal from the primary information. The condition verifier 140 may combine the results of executing the sub-queries to verify whether the query condition is satisfied.

In the example described above, the condition verifier 140 may obtain the information about the opening date and place of the NIPS conference and check whether the current date is one month before the opening date of the conference.

In an example, the condition verifier 140 may need user's login information to automatically search a particular website that may require user's login or user information.

If a user's authentication is needed to carry out the search, the authentication setter 170 may obtain search authentication by requesting the user for authentication or by receiving it beforehand. In an example, if log-on is needed to search a particular website, the authentication setter 170 may be authorized by the user and automatically log onto the website using pre-stored login information. In an example, the authentication setter 170 may communicate with the scheduler 130 to provide information needed to execute a sub-query for log-on. In another example, authentication setter 170 may request the user for login information via the reporter 150. The reporter 150 may interact with the user through an interface, which in one embodiment may be a display 180.

For example, if a website that gives notification regarding the NIPS conference only allows members of the conference to see the notification board, the authentication setter 170 may receive, in advance, login information for the website from the user; and during every monthly search, the condition verifier 140 may use the login information to automatically log onto the website and carry out the search.

In another example, if the user inputs the query, "if NIPS CFP email has come, remind me of the due date", the preprocessor 110 recognizes that "NIPS" is the acronym of Neural Information Processing System and "CFP" is the acronym of Call For Paper, and preprocesses the input query to specify it as "if the email requesting Call for Paper has come from the Neural Information Processing System, remind me of the due date". The query analyzer 120 may analyze the query into "remind me of the due date" as a query goal and "if the email requesting Call for Paper has come from the Neural Information Processing System" as a query condition. In this case, an authentication process is needed to check the emails. The authentication setter 170 may request the user to authenticate the access to a mailbox through the display 180. If the access is authenticated, authentication setter 170 may provide the access authentication information to the scheduler 130. If the authentication setter 170 has failed to be authenticated for the access, executing a sub-query for checking emails cannot be accomplished and hence the query validity checker 160 may discard the input query.

The reporter 150 may report the query processing result in the form of summary, extraction or the combination of the two through the display 180. When the query condition has been satisfied, or when the query condition has not been satisfied, the reporter 150 may provide a report to the user regarding the procedures performed using the display 180. In an example, the reporter 150 may use a summarization algorithm or an extraction algorithm to report a summary of the processing result or report needed information extracted, according to the query goal.

The query validity checker 160 may determine a valid time period of the query and whether the execution of the query should be repeated, thus determining the validity of the query. When a query is needed even after its goal has been achieved, i.e., when searches are continuously needed or constant updating is needed to obtain up-to-date information, the validity checker 160 may decide to maintain the query.

In the above embodiment, if the query validity checker 160 has confirmed that the natural language query is "Inform me every year of the place and dates of the NIPS conference before one month earlier than the opening date" and the fact that the NIPS conference is held every year, the query validity checker 160 may determine that the input query is to be executed every year. In this case, the query validity checker 160 may set the valid time period of the query to be "every year" until the user clears the setting, and then the query validity checker 160 may determine that the query is to be executed every year. By doing so, the user can automatically receive needed information without repeatedly inputting the same query every year.

In an example, the query validity checker 160 may discard the query when a one-time query goal has been achieved and hence the query is finished, or when the query condition is impossible to satisfy.

In an example, the reporter 150 of the apparatus for automatic query processing 100 interacts with the user through an interface. The interface unit may be responsible for inputting and outputting input information for communication between the user and apparatus for automatic query processing 100. In an example, the interface is a display 180. The display 180 may be a physical structure that includes one or more hardware components that provide the ability to render a user interface and/or receive user input. The display 180 can encompass any combination of display region, gesture capture region, a touch sensitive display, and/or a configurable area. The display 180 can be embedded in the apparatus for automatic query processing 100 or may be an external peripheral device that may be attached and detached from the apparatus for automatic query processing 100. The display 180 may be a single-screen or a multi-screen display. A single physical screen can include multiple displays that are managed as separate logical displays permitting different content to be displayed on separate displays although part of the same physical screen. The display 180 may also be implemented as an eye glass display (EGD), which includes one-eyed glass or two-eyed glasses.

Figure 3:
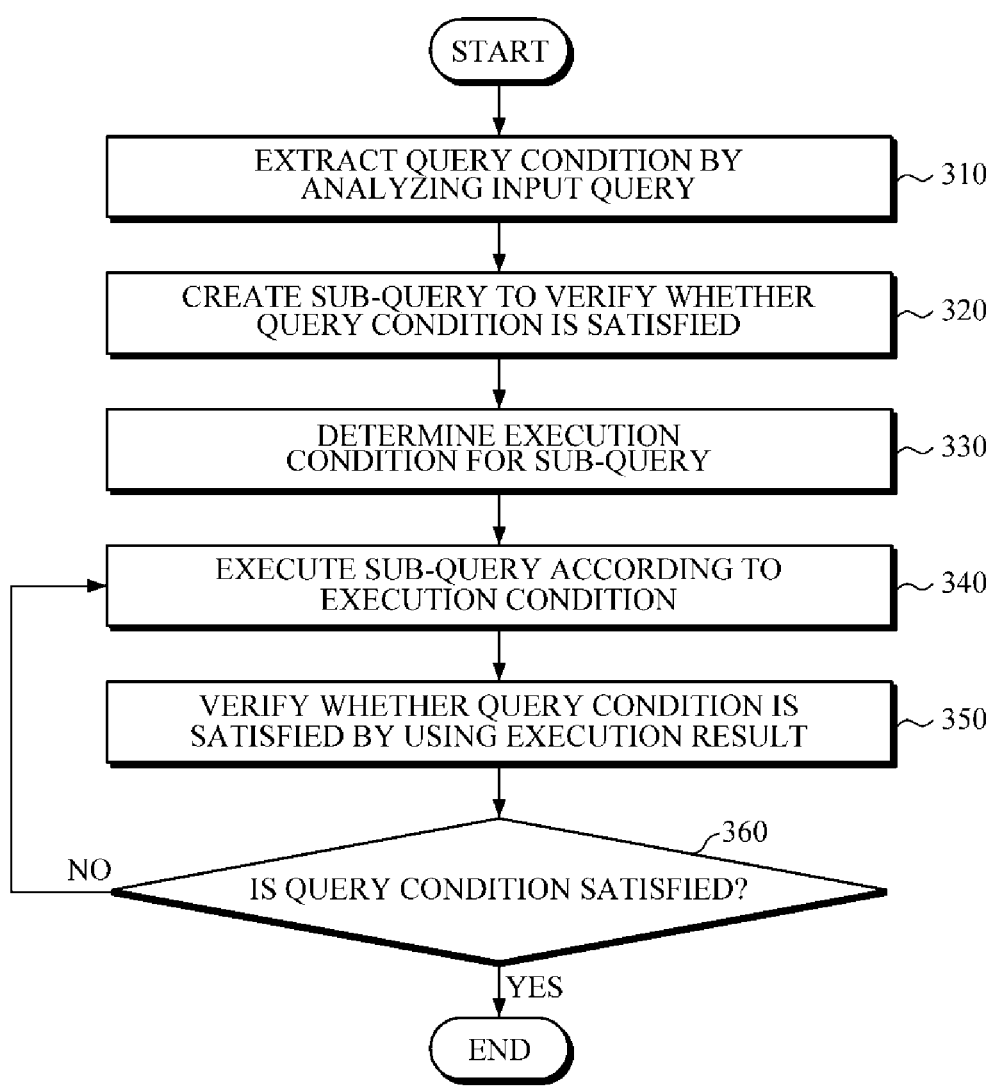
FIG. 3 is a diagram illustrating an example of a method for automatic query processing according to the apparatus shown in FIG. 1.

FIG. 3 is a diagram illustrating a method for automatic query processing according to the example shown in FIG. 1. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. In addition to the description of FIG. 3 below, the above descriptions of FIGS. 1-2, are also applicable to FIG. 3, and are incorporated herein by reference. Thus, the above description may not be repeated here.

In 310, the query analyzer 120 extracts a query condition by analyzing the input query, as depicted. For example, the query analyzer 120 may identify a user's request by analyzing the meaning of the query, and extract the query condition by analyzing the query into the query goal and the query condition. In an example, the query condition may be specified in the query input by the user. In another example, the query analyzer 120 may infer what the query condition is based on the user's request and the query goal, which are obtained from the input query.

In 320, the scheduler 130 may create sub-queries to check whether the query condition is satisfied. In an example, the query is a simple form that contains only one or two requests to be handled. In another example, the query may contain a complex condition or requires continuous acquisition of information. The scheduler 130 may create the sub-queries by segmenting the query, and determine the execution sequence and the execution conditions for the sub-queries.

According to one example, the scheduler 130 may create one or more sub-queries that are related to a method for achieving the extracted query goal. The scheduler 130 may deem needed information as primary information, designate a route for obtaining the primary information, and create the sub-queries so that an operation can be executed using reference information and the primary information, if obtained.

As depicted in 330, the scheduler 130 may set the execution condition for the sub-queries. For example, for the query to monitor a new book of Jane Smith, the scheduler 130 may set the search interval to be "several months" based on a general time interval at which a new book is published. In an example, the scheduler 130 may determine whether to increase or reduce the search interval in view of the Jane Smith's record of book publication.

In addition, the scheduler 130 may reference one or more factors, such as, for example, characteristics of primary information, update rules for primary information, similar situations, and search results, in order to determine whether the sub-queries require continuous search.

If the query condition requires continuous search, for example, if a mailbox is to be searched to inform a user of any unread messages, continuous search is needed so that new information can be conveyed to the user. In this case, the scheduler 130 may designate a search range and a search interval as execution conditions so that mailbox search is carried out once a week, every day, every few hours, or multiple times every hour.

In another example, if the query goal is acquisition of weather information, the scheduler 130 may determine the search interval to be a day or several hours based on characteristics of weather information, which is primary information. If the query is "please let me know any score update in the soccer game", the scheduler 130 may set the execution condition for a sub-query as "every minute" or "when game information is updated."

In 340, the condition verifier 140 may execute the sub-queries according to the set execution condition. For example, the condition verifier 140 may search the web, a cloud, a database, or any other data store to obtain a result of executing the sub-query by analyzing found content.

In one example, the condition verifier 140 may search for web content regarding primary information needed for executing the sub-query, and extract the needed primary information. In another example, the condition verifier 140 alters a method for searching for the needed primary information by performing a related search.

In an example, the condition verifier 140 analyzes the found content by referencing one or more of context information such as, for example, user information, environmental information, and device information. In an example, the apparatus 100 for automatic query processing may obtain needed context information from the digital device or a cloud server in which said apparatus 100 is mounted. For example, when the apparatus 100 is embedded in a smartphone, the condition verifier 140 may obtain a result of executing the sub-query by referencing user information, such as user's schedules, text messages, documents which are stored in the smartphone. In addition, the condition verifier 140 may be able to search for needed information from other devices if search authentication has been obtained.

In 350, the condition verifier 140 verifies whether the query condition is satisfied based on the result of executing the sub-query. If the query condition is satisfied, and the query goal can be inferred, the query processing is completed.

In 360, if the verification result of the condition verifier 140 shows that the query condition is not satisfied, the sub-queries are re-executed according to the execution condition in 340. In an example, if a search interval is set as the execution condition for a sub-query, the condition verifier 140 may repeatedly carry out the sub-query until its result satisfies the query condition.

In addition to the above examples, the condition verifier 140 may execute the sub-queries using various search means and search ranges, and hence the range of search by the condition verifier 140 will not be construed to be limited to the aforesaid embodiments.

According to one example, the query input by the user may be related to other devices that are connected to the apparatus 100 over a network. For example, if the query "if the black toner of the printer is less than 10% or less than five sheets of paper are left, text me" is input to the query analyzer 120, the condition verifier 140 may monitor the operation status of the printer and verify whether a query condition is satisfied or not.

FIG. 4A is a diagram illustrating an example of a method for automatic query processing according to the example shown in FIG. 2. Hereinafter, the method for automatic query processing will be described with reference to FIGS. 2 and 4A, wherein a description that is redundant to that of the embodiment shown in FIG. 3 will be briefly given. The operations in FIG. 4A may be performed in the sequence and manner as shown, although the order of some operations may be changed or some of the operations omitted without departing from the spirit and scope of the illustrative examples described. Many of the operations shown in FIG. 4A may be performed in parallel or concurrently. In addition to the description of FIG. 4A below, the above descriptions of FIGS. 1-3, are also applicable to FIG. 4A, and are incorporated herein by reference. Thus, the above description may not be repeated here.

In 410, in response to a natural language query being input, the preprocessor 110 may transform the input query into a normalized query. In an example, the natural language is transformed into a machine-understandable form. The preprocessor 110 may preprocess the natural language query by defining abbreviations or acronyms that are contained in the natural language query and correcting typos, errors, and a format of a query sentence.

In 420, the query analyzer 120 extracts the query condition by analyzing the query that is inputted. In 430, the query analyzer 120 analyzes the query goal that can be inferred from the query condition. In an example, the query analyzer 120 may understand a user's request, analyze the query, and determine the query goal and the query condition.

In 440, the scheduler 130 creates one or more sub-queries related to a method for achieving the extracted query goal. Based on the query condition, the scheduler may create sub-queries that specify a method for obtaining primary information and a method for achieving the query goal using the primary information.

For example, the scheduler 130 may identify a keyword that is a user's interest extracted from the query as a search target, and may create sub-queries regarding the website, search method, and the time at which a search is to be carried out. The sub-queries may be created in the form of a specific query execution method according to the query goal.

In 450, the scheduler 130 may determine whether each sub-query requires continuous search, and if it does, the scheduler 130 may set a search interval for each sub-query. According to one example, the scheduler 130 may determine a search target, a search method, a search range, a search time, and a search interval, as execution conditions for the sub-queries. In an example, the scheduler 130 may reference factors, such as, for example, characteristics of primary information, update rules for primary information, similar situations, and search results to determine whether each sub-query requires continuous search.

In an example, if one item of primary information needed for achieving the sub-query's goal is not obtained, the scheduler 130 may decide to repeat the search and designate the search interval as the execution condition.

In another example, If the query condition requires continuous search, for example, if it is needed to search a mailbox to inform a user of any unread messages, continuous search is needed so that the user can be informed of any new information. In this case, the scheduler 130 may designate a search range and a search interval as execution conditions so that mailbox search is performed once a week, every day, or every few hours.

In another example, if the query goal is acquisition of weather information, the scheduler 130 may determine the search interval to be a day or several hours based on characteristics of weather information, which is primary information. If the query is "please let me know any score update in the soccer game", the scheduler 130 may set the execution condition for a sub-query as "every minute" or "when game information is updated."

In 460, the condition verifier 140 executes the sub-queries according to the set search interval. In 470, the condition verifier 140 verifies whether the query condition is satisfied, by using the results of executing the sub-queries.

In 480, the condition verifier 140 determines whether the query condition is satisfied. If the query condition is satisfied in 480, the reporter 150 reports a query processing result in the form of summary, extract, or the combination of the two, as depicted in 490.

When the query condition has been satisfied, or even when the query condition has not been satisfied, the reporter 150 may provide a report to the user regarding the procedures performed using the interface, which in an example is the display 180. In an example, the reporter 150 may use a summarization algorithm or an extraction algorithm to report a summary of the processing result or report needed information extracted, according to the query goal.

If the query condition is not satisfied in 480, in 460, the condition verifier 140 repeatedly executes the sub-queries according to the search interval.

FIG. 4B is a flowchart illustrating in detail the method for automatic query processing according to the example shown in FIG. 2. The operations in FIG. 4B may be performed in the sequence and manner as shown, although the order of some operations may be changed or some of the operations omitted without departing from the spirit and scope of the illustrative examples described. Many of the operations shown in FIG. 4B may be performed in parallel or concurrently. In addition to the description of FIG. 4B below, the above descriptions of FIGS. 1-4A, are also applicable to FIG. 4B, and are incorporated herein by reference. Thus, the above description may not be repeated here. In an example, the preprocessor 110 receives a query in the form of natural language, "Inform me every year of the place and dates of the NIPS conference before one month earlier that the opening date", as depicted in 415.

In 425, the preprocessor 110 recognizes that "NIPS" is the acronym of "Neural Information Processing System" and preprocesses the input query to specify it as "Inform me every year of the place and dates of Neural Information Processing System conference one month before the opening date."

In 435, the query analyzer 120 may analyze the above query into "inform the user of the place and dates of the NIPS conference" as a query goal and "one month before the opening date of the NIPS conference" as a query condition.

In 445, the scheduler 130 creates sub-queries to, for example, (1) check websites and boards that release NIPS-related information, (2) search for an opening date and place of the NIPS conference, (3) count the number of days from the current date to the date that is one month before the opening date of the NIPS conference, and (4) provide information about the opening date and place of the NIPS conference one month (or less) beforehand.

In 455, if the scheduler 130 fails to obtain information about the opening date and place of the NIPS conference, the scheduler 130 sets the execution condition so that a monthly search is carried out. In an example, the scheduler 130 may determine a search interval by combining the interval at which The NIPS conference usually is held and the rules for update of NIPS-related notification.

However, the above description will be construed as the example, and the scheduler 130 may determine various execution conditions in addition to the search interval.

In 465, the condition verifier 140 executes the sub-queries according to the search interval, as depicted. For example using the result of executing the sub-query, the condition verifier 140 may obtain the information about the opening date and place of the NIPS conference and check whether the current date is a month before the opening date of said conference.

In 485, the condition verifier 140 determines whether the information about the opening date and place of the NIPS conference has been obtained and that the current date is a month before the opening date, as depicted. In response to the condition verifier's determination in 485 that all needed information has been obtained and that the current date is a month before the opening date of the NIPS conference, i.e., the query condition is satisfied, the reporter 150 provides information about the opening date and place of said conference to the user, as depicted in 495.

In an example, the condition verifier 140 may have obtained information about the opening date and place of the NIPS conference, however, if there are currently two months left until the opening date of the NIPS conference, it may be determined in 485 that the query condition has not been satisfied. In 465, the condition verifier 140 repeatedly executes the sub-queries according to the search interval. The condition verifier 140 may re-execute the sub-query at monthly intervals to count the number of days from the current date to the date that is one month before the opening date of the NIPS conference. When the result of re-executing the sub-query shows that there is only one month left until the opening date of the NIPS conference, in 485, the condition verifier 140 determines that the query condition has been satisfied, since the current date is one month before the opening date of said conference and the information about the opening date and place of the NIPS conference has been obtained. In this case, as the query condition has been satisfied, the reporter 150 may provide information about the opening date and place of the NIPS conference to the user.

As described above, a search target, a search method, a search range, a search time, and a search interval may also be determined as an execution condition for the sub-queries.

When continuous search is needed or the query needs to be repeatedly executed, the apparatus 100 for automatic query processing may be applied.

Figure 5:
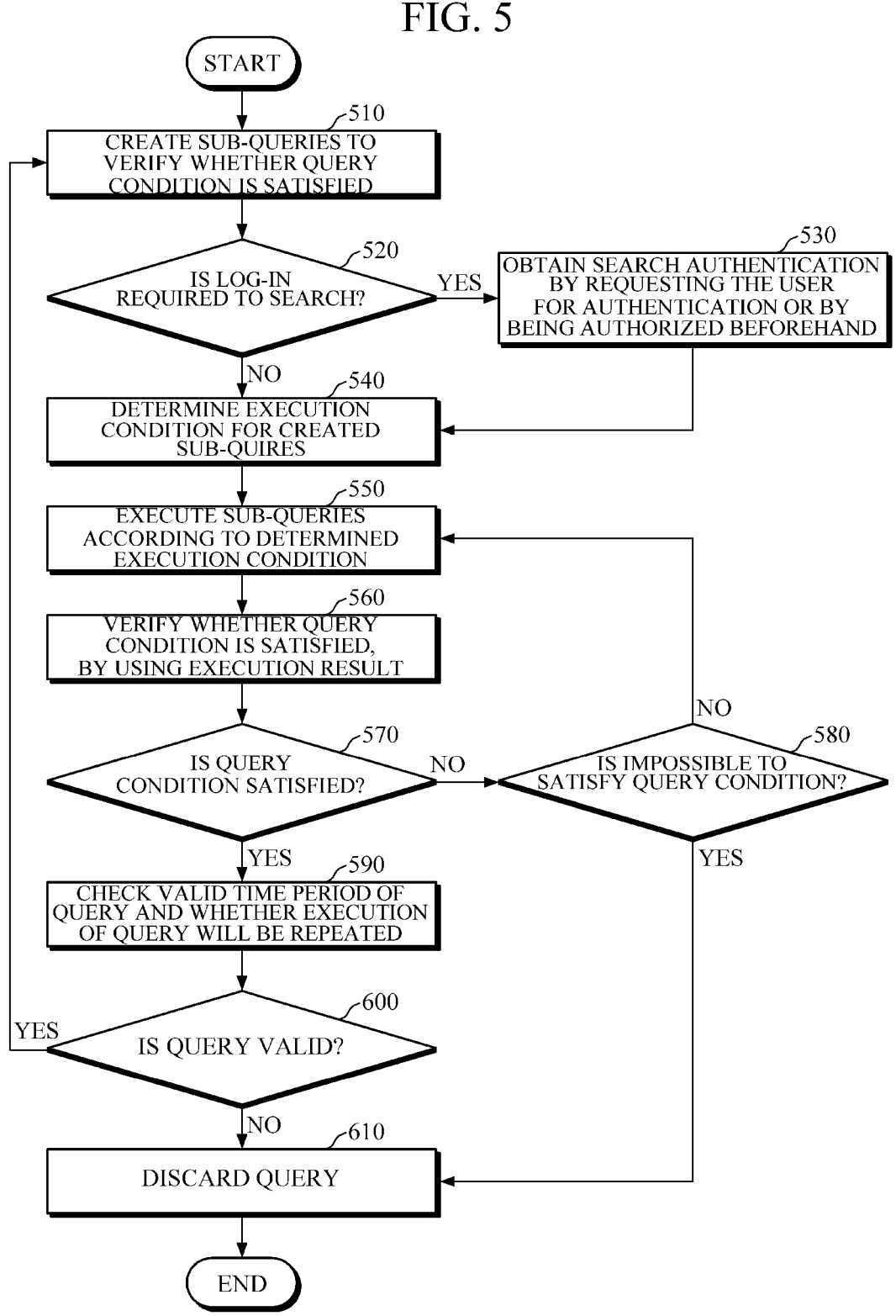
FIG. 5 is a diagram illustrating an example of a method for automatic query processing according to the apparatus shown in FIG. 2.

FIG. 5 is a diagram illustrating an example of a method for automatic query processing using the apparatus shown in FIG. 2. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. In addition to the description of FIG. 5 below, the above descriptions of FIGS. 1-4B, are also applicable to FIG. 5, and are incorporated herein by reference. Thus, the above description may not be repeated here.

In 510, the scheduler 130 creates sub-queries to verify whether the query condition is satisfied.

In 520, the authentication setter 170 determines whether a user needs to be logged-in to carry out a search. In an example, the condition verifier 140 may need the user's login information to search a particular website, which may require user's login information or user information.

If a user's authentication is needed to carry out search, the authentication setter 170 may obtain search authentication by requesting the user for authentication or by obtained it beforehand. For example, if a user needs to be logged-in to search a particular website, the authentication setter 170 may be authorized by the user and automatically log onto the website using pre-stored login information. The authentication setter 170 may communicate with the scheduler 130 to provide information needed to execute a sub-query for logging in. In another example, the authentication setter 170 requests the user for login information via the reporter 150 and/or the display 180 and, in turn, receive the login information.

For example, if a website gives notification regarding the NIPS conference only allows members of the conference to see the notification board, the authentication setter 170 may receive, in advance, login information for the website from the user, and every monthly search, the condition verifier 140 may use the login information to automatically log onto the website and perform the search.

In another example, if the user inputs the query, "if NIPS CFP email has come, remind me of the due date", the preprocessor 110 recognizes that "NIPS" is the acronym of Neural Information Processing System and "CFP" is the acronym of Call For Paper. The preprocessor 110 preprocesses the input query to specify it as "if the email requesting Call for Paper has come from the Neural Information Processing System, remind me of the due date." The query analyzer 120 analyzes the query into "remind me of the due date" as a query goal and "if the email requesting Call for Paper has come from the Neural Information Processing System" as a query condition. In this case, an authentication process is needed to check the emails. The authentication setter 170 may request the user to authenticate the access to a mailbox and, if the access is authenticated, it may provide the access authentication information to the scheduler 130. If the authentication setter 170 has is not authenticated for the access, executing a sub-query for checking emails cannot be accomplished and hence the query validity checker 160 may determine to discard the input query.

If log-in is not needed, the scheduler 130 determines an execution condition for the created sub-queries, as depicted in 540. At this time, if login information is needed for executing the sub-queries, the scheduler 130 may set receiving of login information from the user as the execution condition.

In 550, the condition verifier 140 executes the sub-queries according to the determined execution condition. In 560, the condition verifier 140 verifies whether the query condition has been satisfied, using the results of executing the sub-queries.

In 570, the condition verifier 140 determines whether the query condition has been satisfied. If the query condition has not been satisfied, in 580, the condition verifier 140 determines whether the query condition is one that can actually be satisfied. If it is not possible to satisfy the query condition, the query is discarded, as depicted in 610.

If the query condition has not been satisfied in 570, but it is still possible to satisfy the query condition in 580, the condition verifier 140 repeatedly determines the execution condition for the sub-queries, as depicted in 540.

If the query condition is satisfied, then it is possible to infer the query goal from the query condition, and hence the query processing result is reported to the user using the display 180.

In 590, the query validity checker 160 checks a valid time-period of the query and whether the execution of the query will be repeated. If it is determined that the query is valid, the flow proceeds to operation 510 in which the sub-queries are created to verify whether the query condition is satisfied. If it is determined that a valid time for the query has elapsed, the query may be discarded.

For example, where a query is needed even after its goal has been achieved, such as, for example, when searches are continuously needed or constant updating is needed to obtain up-to-date information, the validity checker 160 may decide to maintain the query.

In one example, if the query validity checker 160 has confirmed that the natural language query is "Inform me every year of the place and dates of the NIPS conference one month before the opening date" and the fact that the NIPS conference is held every year, the query validity checker 160 may determine that the input query is to be executed every year. In this case, the query validity checker 160 may set the valid time period of the query to be "every year" until the user clears the setting, and then the query validity checker 160 may determine that the query is to be executed every year. By doing so, the user can automatically receive needed information without repeatedly inputting the same query every year.

In an example, the query validity checker 160 may determine to discard the query, as depicted in 610, when a one-time query goal has been achieved and hence the query is finished. Also, the query validity checker 160 may discard the query when it is determined in 580 that the query condition is impossible to satisfy.

The apparatus for automatic query processing 100, query analyzer 120, scheduler 130, condition verifier 140, preprocessor 110, reporter 150, query validity checker 160, authentication setter 170, interface, and display 180 described in FIGS. 1 and 2 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for automatic query processing comprising:
   a processor configured to:
   extract a query condition from an input query;
   create one or more first sub-queries based on the input query;
   determine whether the one or more first sub-queries is required to be executed recursively based on the query condition;
   based on the one or more first sub-queries being required to be executed recursively, determine a search interval for executing the one or more first sub-queries recursively based on characteristics of primary information required for executing the one or more first sub-queries and update rules for the primary information;
   execute the one or more first sub-queries at the determined search interval, recursively;
   verify whether the query condition is satisfied based on each of results of executing the one or more first sub-queries recursively; and
   based on verifying that the query condition is satisfied, provide searched information of the input query based on the results of executing the one or more first sub-queries.

2. The apparatus of claim 1, wherein the processor is further configured to transform a natural language query into a normalized query, based on the input query being the natural language query.

3. The apparatus of claim 1, wherein the processor is further configured to:
   analyze the input query to extract a query goal, and
   create one or more second sub-queries to achieve the extracted query goal.

4. The apparatus of claim 1, wherein the processor is further configured to determine at least one of a search target, a search method, a search range, and a search time for executing the one or more first sub-queries.

5. The apparatus of claim 1, wherein the processor is further configured to:
   search any one or any combination of a web, a cloud, and a database, and
   obtain the results of executing the one or more first sub-queries by analyzing found content.

6. The apparatus of claim 5, wherein the processor is further configured to analyze the found content by referencing at least one of user information, environmental information, and device information.

7. The apparatus of claim 1, wherein the processor is further configured to:
   request a user for authentication information or store the authentication information in advance, based on the authentication information being needed for the one or more first sub-queries.

8. The apparatus of claim 1, wherein the processor is further configured to check a valid time period of the input query and whether to repeat execution of the input query.

9. The apparatus of claim 4, wherein the processor is further configured to:
   identify a keyword from the input query as a search target, and
   execute the one or more first sub-queries according to the determined search interval and the keyword.

10. A method for automatic query processing, comprising:
    extracting a query condition by analyzing an input query;
    creating one or more first sub-queries based on the input query;
    determining whether the one or more first sub-queries is required to be executed recursively based on the query condition;
    based on the one or more first sub-queries being required to be executed recursively, determining a search interval for executing the one or more first sub-queries recursively, based on characteristics of primary information required for executing the one or more first sub-queries and update rules for the primary information;
    executing the one or more first sub-queries at the determined search interval recursively;
    verifying whether the query condition is satisfied, based on each of results of executing the one or more first sub-queries recursively; and
    based on verifying that the query condition is satisfied, providing searched information of the input query based on the results of executing the one or more first sub-queries.

11. The method of claim 10, further comprising:
    transforming a natural language query into a normalized query, based on the input query being the natural language query.

12. The method of claim 10, wherein the extracting of the query condition comprises analyzing the input query to extract a query goal, and the creating of the one or more first sub-queries comprises creating one or more second sub-queries for achieving the extracted query goal.

13. The method of claim 10, further comprising determining at least one of a search target, a search method, a search range, and a search time for executing the one or more first sub-queries.

14. The method of claim 10, wherein the executing of the one or more first sub-queries comprises searching at least one of a web, a cloud, and a database, and obtaining the results of executing the one or more first sub-queries by analyzing found content.

15. The method of claim 10, further comprising:
   requesting a user for authentication information or storing the authentication information in advance, based on the authentication information being needed for the one or more first sub-queries.

16. A non-transitory computer-readable storage medium storing instructions that, when executed by a processor, cause the processor to perform the method of claim 10.

* * * * *